United States Patent [19]

Newman et al.

[11] 3,845,352

[45] Oct. 29, 1974

[54] POWER SUPPLY SYSTEM FOR TELEVISION RECEIVER

[75] Inventors: Robert H. Newman, Norfolk; Mervyn M. Pluck, Portsmouth, both of Va.

[73] Assignee: General Electric Company, Portsmouth, Va.

[22] Filed: Dec. 21, 1971

[21] Appl. No.: 210,411

[52] U.S. Cl. .................315/393, 315/397, 315/411
[51] Int. Cl. ............................................ H01j 29/70
[58] Field of Search...... 315/27 TD, 27 GD, 28, 29, 315/27 R

[56] References Cited

UNITED STATES PATENTS

| | | | |
|---|---|---|---|
| 2,762,870 | 9/1956 | Sziklai et al. | 315/27 TD |
| 2,964,673 | 12/1960 | Stanley | 315/27 TD |
| 3,426,244 | 2/1969 | Strachanow | 315/27 TD |
| 3,501,672 | 3/1970 | Xenakis | 315/27 TD |
| 3,648,099 | 3/1972 | Otten et al. | 315/27 GD |

*Primary Examiner*—Maynard R. Wilbur
*Assistant Examiner*—J. M. Potenza

[57] ABSTRACT

The vertical deflection windings of a television receiver are coupled directly to the output of a push-pull amplifier comprising a complementary pair of electronic devices. Bipolar voltages for driving the complementary pair are derived from horizontal scansion signals by a pair of oppositely-poled secondary windings on the horizontal output transformer. In a preferred embodiment, a third secondary winding on the output transformer is used to derive a biasing voltage from horizontal scansion signals. The voltage thus derived is utilized to bias a sawtooth generator which supplies input signals to the push-pull amplifier. The signals produced by the sawtooth generator vary in amplitude as a function of the magnitude of the horizontal deflection current.

5 Claims, 1 Drawing Figure

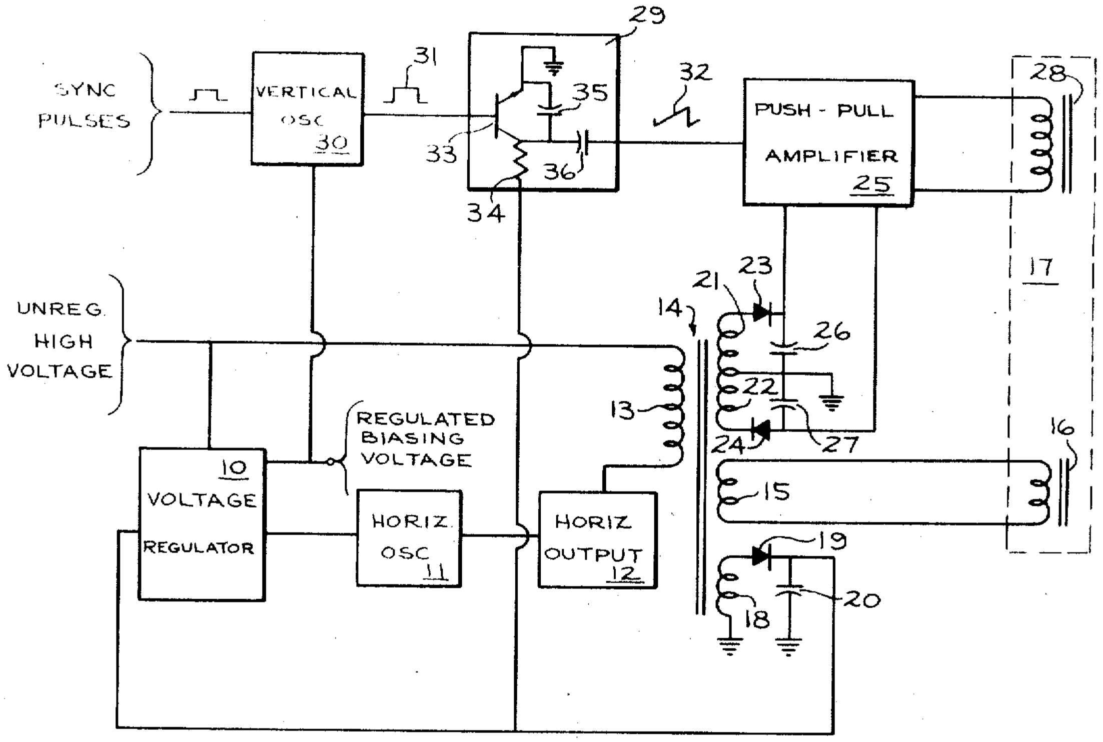
INVENTORS
ROBERT H. NEWMAN
BY & MERVYN M. PLUCK
Frederick W. Powers III
THEIR ATTORNEY

POWER SUPPLY SYSTEM FOR TELEVISION RECEIVER

BACKGROUND OF THE INVENTION

The present invention relates generally to television receivers and, more particularly, to means for producing voltages for energizing certain portions thereof.

A problem which has traditionally faced designers of television receivers has been to maximize the efficiency of those portions of the receiver circuit which operate to deflect the electron beam across the face of the cathode ray tube. In order to produce the magnetic fields necessary for proper electron beam deflection, relatively large amounts of current must be supplied. In addition, the current must evince a predetermined waveshape in order that the deflection process be carried on with minimal distortion. Typically, deflection windings have been driven through transformers, the transformers serving to provide DC isolation between the final or output stages of the deflection systems, and the deflection windings themselves. The transformers also serve to impart the desired configuration to the current waveshape, and to provide a current source of relatively low impedance.

In some cases, the vertical deflection transformer is eliminated and the vertical windings are coupled to a vertical amplification stage which provides current having the desired sawtooth configuration to the windings. It has long been recognized that, in theory at least, to maximize the efficiency of the deflection drive system an output stage using push-pull operation would be highly desirable. In practice, however, such a design is often not feasible. In order to energize a push-pull amplifier, it is necessary to provide a reference voltage level such as ground, a first voltage higher than reference, and a second voltage lower than the reference. In the case of large receivers utilizing supply or "mains" transformers for converting line voltage to that required by the receiver circuitry, it has long been possible to derive bipolar D.C. voltages by providing suitable secondary windings and rectifiers.

It will be appreciated, however, that mains transformers are not only relatively expensive but contribute substantially to the weight of a television chassis. Such transformers are thus not desirable in modern, lightweight television receivers, particularly those of the portable variety. Transformers are therefore often deleted from many modern portable receivers. In doing so, however, a source of bipolar voltages for a complementary push-pull amplifier is eliminated. For this reason, attempts have been made to utilize push-pull amplifiers with single-polarity voltage supplies. Usually the amplifier is referenced to an intermediate positive voltage, and driven between a second, higher positive voltage and ground or reference potential. In this instance, however, the deflection winding must be decoupled from the amplifier by means of a capacitor. The capacitor provides DC isolation between the push-pull amplifier and the deflection winding so that bidirectional current can flow through the winding. Due to the magnitude of the current involved, however, the coupling capacitor must be very large. Such a capacitor is inordinately expensive, and moreover contributes to a non-linearization of the current transmitted thereby so that the amplifier must be designed to produce a compensating, non-linear current output.

Even with a satisfactory voltage supply, however, another undesirable phenomenon often occurs. By separating the horizontal and vertical deflection stages fluctuations or aberrations in the deflection current to one set of deflection windings, for instance the horizontal windings, are not reflected in current flow to the other windings so that the displayed image may undergo an expansion or contraction in one dimension without a corresponding change in the other, perpendicular dimension. Such changes then appear as a "squeezing" or "stretching" of the displayed image.

It will therefore be seen that it would be desirable to provide means in a television receiver for producing bipolar voltages which does not require the presence of a mains transformer, and further to cause the magnitude of deflection current in one set of windings to vary as a function of current in the other set of windings.

It is therefore an object of the present invention to provide an improved means for deriving bipolar voltages in a television receiver.

It is another object of the present invention to provide bipolar energizing voltages in a television receiver which is not equipped with a mains transformer.

It is still another object of the invention to produce a biasing voltage for a vertical deflection system which varies with horizontal deflection current.

SUMMARY OF THE INVENTION

Briefly stated, in accordance with one aspect of the invention the foregoing objects are achieved by providing a horizontal output transformer with an additional pair of secondary windings. The windings are oppositely poled and coupled to opposite sides of a push-pull amplifier by means of suitably-oriented rectifiers. Upon the production of a scansion signal in the horizontal transformer windings, voltages of opposite polarities arise across the two windings and are applied by means of the rectifiers to the pushpull amplifier.

In a further embodiment, a third secondary winding having a rectifier associated therewith is adapted to produce a positive voltage upon the occurrence of a horizontal scansion signal. The voltage thus derived is utilized to bias a vertical sawtooth generator so that the magnitude of the signal outputted by the sawtooth generator is constrained to vary as a function of horizontal output current.

BRIEF DESCRIPTION OF THE DRAWING

While the specification concludes with claims particularly pointing out and distinctly claiming the subject matter which is regarded as the invention, it is believed that the invention will be better understood from the following description of the preferred embodiment taken in conjunction with the accompanying FIGURE which is an idealized schematic drawing of selected portions of a television receiver circuit utilizing principles of the present invention.

DESCRIPTION OF A PREFERRED EMBODIMENT

Referring now to the FIGURE, an idealized diagram of the deflection system of a television receiver is shown. Unregulated D.C. voltage, such as that which may be derived by rectifying standard 110 volt AC current, is applied to a voltage regulator 10 and a horizontal output stage 12. The unregulated voltage thus derived commonly approximates 135 volts, and thus is not suitable for biasing many of the components of present-day solid state receiver circuits. In order to provide the requisite low voltage without the need for expensive or inefficient prior-art regulating means such as large zener diodes and associated resistors, a voltage regulator 10 of the type disclosed in U.S. Pat. 3,725,903, filed Nov. 8, 1971, by the present inventors and assigned to the assignee of the present invention may be used. Such a voltage supply produces both a pilot voltage derived directly from the unregulated line voltage, and a second, fully regulated biasing voltage for application to most other parts of the receiver circuit. The pilot voltage is obtained in the presence of only limited current flow and is utilized to initiate operation of a horizontal oscillator 11 which triggers horizontal output stage 12. Output stage 12 gates relatively large amounts of current derived from the source of unregulated line voltage through the primary winding 13 of horizontal output transformer 14. Ramp-like scansion signals thus induced in secondary winding 15 of the horizontal output transformer are applied to a horizontal deflection winding 16 which comprises a portion of deflection yoke 17.

A further secondary winding 18 is provided upon the output transformer. Positive-going scansion signals appearing at the topmost end thereof are rectified and smoothed by suitable means such as a diode 19 and reservoir capacitor 20 and then transmitted to voltage regulator 10, where they are processed by regulating circuitry to provide a low impedance source of biasing potential for operating further portions of the receiver.

In the present invention, additional secondary windings 21 and 22 are provided on the horizontal output transformer. In the present embodiment, secondary windings 21 and 22 comprise a single, continuous element having a tap intermediate the ends thereof and connected to ground. Opposite ends of windings 21 and 22 are coupled to rectifiers 23 and 24 for supplying bipolar voltages to beam deflection drive means comprising a push-pull complementary amplifier 25. Reservoir capacitors 26 and 27 serve to mitigate the excursions or ripples in the voltages by rectifiers 23 and 24, respectively. Current produced by amplifier 25 is applied to direct-coupled vertical deflection windings 28, which may be disposed upon the core of yoke 17 along with horizontal deflection windings 16.

The unregulated D.C. voltage derived by secondary winding 18 from the horizontal transformer is advantageously coupled to a sawtooth generator 29. A vertical oscillator 30 receives periodic synchronizing signals derived from a received video signal and applies properly-shaped pulses 31 to sawtooth generator 29 in synchronism with the received video signal. As will be understood by those skilled in the art, sawtooth generator 29 serves to produce a periodic, linearly increasing or ramp-like voltage 32 in response to signals inputted by vertical oscillator 30.

The operation of the system disclosed in the FIGURE will now be discussed, with emphasis upon the vertical deflection system. When a master switch (not shown) is closed to energize the receiver, unregulated rectified line voltage of approximately 135 volts is applied to voltage regulator 10, and through primary winding 13 to horizontal output stage 12. As is taught by our aforementioned U.S. Pat. No. 3,752,903 the unregulated high voltage is applied to suitable circuitry for producing a regulated, low pilot voltage. This voltage, evincing a relatively high source impedance, is utilized to energize horizontal oscillator 11. When horizontal oscillator 11 begins to run in response to the application of the pilot voltage, from voltage regulator 10 it actuates horizontal drive stage 12 to produce horizontal scansion signals in primary winding 13 of horizontal output transformer 14. The scansion signals commonly take the form of voltage pulses which include ramp-like or sawtooth scansion currents in the various secondary windings. The sawtooth or ramplike portion of the waveform occurs over substantially 5/6 of each horizontal deflection period.

At the termination of each sawtooth, the inductive action of horizontal output transformer 14 produces an inductive back e.m.f. or "kick" effecting what is known as a flyback pulse in the secondary windings. The flyback pulse, while of very short duration, is usually of a high magnitude and is therefore commonly utilized to produce the high voltages necessary in other parts of the receiver. It will, however, be appreciated that such flyback pulses are a relatively inefficient source of power since they occur for substantially only 1/6 of each horizontal scansion period. The scansion signals, however, provide a potentially more efficient source of auxiliary power. Scansion signals are derived from the horizontal output transformer by means of secondary winding 18 and pass through rectifier 19 to voltage regulator 10 and to sawtooth generator 29 in the vertical deflection system.

As was the case with the horizontal deflection system, in order to periodically deflect the electron beam in a vertical sense it is necessary to produce periodic ramp-like or sawtooth signals. While many mechanisms have been devised to accomplish this, one that has been successfully utilized is schematically illustrated at 29. A transistor 33 is coupled by means of a resistor 34 to a source of positive potential, here the rectified scansion signals outputted at the cathode of rectifier 19. A timing capacitor 35 is coupled across the emitter-collector circuit of transistor 33, and the emitter terminal is connected to ground. When no positive-going pulses are received from vertical oscillator 30, transistor 33 is substantially nonconductive, allowing capacitor 35 to be charged by current flowing through resistor 34. A positive voltage thus begins to arise at the collector terminal of transistor 33. Upon the reception of a positive-going pulse from vertical oscillator 30 transistor 33 is biased into conduction, rapidly discharging capacitor 35 to cause the voltage thereacross to drop rapidly. The sawtooth waveform thus produced is transmitted across a coupling capacitor 36 to the input terminal of a push-pull amplifier 25.

While push-pull amplifiers are well known in the art they have been utilized primarily in television receivers having mains transformers, the mains transformers being employed to supply the bipolar voltages necessary to energize the push-pull amplifier. As is commonly recognized, a push-pull amplifier comprises a pair of oppositely-connected or complementary electronic devices such as an NPN transistor and a PNP transistor coupled together at the emitter terminals thereof, the distal or collector terminals being connected to sources of opposite-polarity voltage. The complementary devices conduct alternately, one producing current which flows outwardly from the amplifier, the other effecting current flow in the opposite direction so that the amplifier produces current which periodically alternates in direction. Hence, the push-pull nomenclature. The output terminals of the push-pull amplifier 25 are connected directly to vertical deflection winding 28, eliminating the need for an expensive coupling capacitor which would tend to detract from the linearity of the sawtooth current flowing in winding 28.

In order to provide the requisite bipolar voltage to the push-pull amplifier 25, horizontal output transformer 14 is provided with additional secondary windings 21 and 22. Windings 21 and 22 advantageously comprise two portions of a continuous conductor defined by a tap which is connected to ground or reference potential. In the illustrated embodiment, when pulses are applied to the primary winding 13 by horizontal output stage 12 a positive-going sawtooth or scansion voltage appears at the top end of winding 21. A forwardly-poled rectifier 23, followed by a reservoir capacitor 26, directs current derived from the secondary winding to one terminal of push-pull amplifier 25. The lower one of the windings 22 is poled so that a negative-going sawtooth or scansion voltage arises at the lowermost end of the segment. A properly-poled rectifier 24, followed by a reservoir capacitor 27, is coupled from the lowermost end of secondary winding 22 to the push-pull amplifier for providing a voltage thereto which is negative with respect to ground.

Secondary windings 21 and 22 thus serve as an auxiliary power source of high efficiency, producing bipolar voltages suitable for application to push-pull amplifier 25 without the need for a heavy, expensive mains transformer. Still further, secondary windings 21 and 22 comprise a low impedance source of current since the source impedance of transformer 14, derived from that of horizontal output stage 12, must necessarily be of a low order in order to supply adequate current to horizontal deflection windings 16.

In a preferred embodiment, the unregulated voltage derived from the horizontal scansion signals by secondary winding 18 is used to bias the vertical sawtooth generator 29 so that the magnitude of the vertical deflection current is caused to track that of the horizontal deflection current. The sawtooth generator 29 comprises a resistor 34 coupled in series with the parallel combination of the emitter-collector circuit of transistor 33 and capacitor 35. In the absence of positive-going pulses from vertical oscillator 30, transistor 33 remains disabled and thus nonconductive. The voltage across capacitor 35 then rises in a substantially linear fashion, charging current flowing to the capacitor from secondary winding 18 by means of resistor 34. The magnitude of the voltage appearing across capacitor 35 at any given time is a function of the size of capacitor 35, the magnitude of resistor 34 and the value of the biasing voltage impressed across the series resistor-capacitor combination. Should the magnitude of the horizontal deflection current increase, the unregulated biasing voltage arising at the cathode of rectifier 19 will undergo a corresponding increase. As the biasing voltage increases, capacitor 35 accrues a greater amount of charge in a given time, producing a higher voltage at the collector terminal of transistor 33. The sawtooth wave transmitted across coupling capacitor 36 is therefore caused to be of a commensurately greater value, serving to drive push-pull amplifier 25 harder and thus effecting a vertical deflection current of correspondingly greater magnitude.

If instead the magnitude of the signal produced by horizontal output stage 12 lessens so that a corresponding decrease occurs in the magnitude of the current flowing through horizontal deflection winding 16, a related decrease will occur in the voltage provided by rectifier 19. This decrease in voltage is reflected by a lessened bias across the series combination of resistor 34 and capacitor 35, so that the voltage produced by sawtooth generator 29 will undergo a decrease proportional to that of the horizontal deflection current. The diminished sawtooth signal drives push-pull amplifier 25 to a lessened degree, so that vertical deflection current decreases in a manner which is directly related to the decrease in the horizontal deflection current. The currents produced for deflecting the electron beams in a horizontal and a vertical sense are both decreased by approximately equal percentages, so that the proportion or aspect ratio of the display produced on the viewing screen of the television receiver remains substantially constant. Since the vertical dimension of the raster tracks the horizontal dimension, variations in horizontal deflection system characteristics merely effect a diminution or enlargement of the overall picture size rather than a distortion of the display. The display is therefore constrained to remain properly proportioned despite variations in various parameters of the deflection system due to aging, temperature variations, etc.

It will now be seen that there has been described an improved means for deriving bipolar voltages for energizing a complementary or push-pull amplification means in a television receiver. Moreover, the voltage thus derived is attained at a relatively low impedance level, and in a highly efficient manner due to the duty cycle of the signals from which the voltages are derived. It will be seen that by deriving energizing voltage for a vertical deflection system sawtooth generator from horizontal scansion signals, the magnitude of vertical deflection current is constrained to vary with horizontal deflection current so that the ratio of the displayed image remains constant.

As will be evident from the foregoing description, certain aspects of the invention are not limited to the particular details of the examples illustrated. For instance, it will be recognized that while a tapped, unitary winding is illustrated for use in deriving the required bipolar voltage, two separate secondary windings may alternatively be used. Similarly, the specific circuitry of sawtooth generator 29 may be varied to suit other applications, it being recognized that other sawtooth generating circuits are adaptable for use with an unregulated biasing voltage. It is therefore contemplated that other modifications or applications will occur to those skilled in the art, and it is intended that the appended claims shall cover all such modifications and applications as do not depart from the true spirit and scope of the invention.

What is claimed as new and desired to be secured by Letters Patent of the United States is:

1. In a television receiver including a cathode ray tube adapted to produce at least one electron beam therein and having vertical deflection windings disposed adjacent thereto for effecting the deflection of said electron beam in a vertical sense, the combination comprising:

push-pull amplifier means directly coupled to the vertical deflection windings for supplying bi-directional current to said windings;

sawtooth generator means for applying a periodic ramp-like voltage to said push-pull amplifier means;

transformer means having a primary winding formed thereon;

means for applying horizontal scansion signals to said primary windings;

first winding means formed on said transformer means and being poled to respond to said scansion signals of a first polarity with respect to a reference potential;

first rectifier means coupled to said first winding means to transmit a DC supply voltage of said first polarity to said push-pull amplifier means;

second winding means formed on said transformer means and being poled to respond to said scansion signals of a second polarity with respect to a reference potential;

second rectifier means coupled to said second winding means to transmit a DC supply voltage of said second polarity to said push-pull amplifier means;

said first and second rectifiers and said first and second winding means thereby providing a low voltage, high current, bi-polar supply for said push-pull amplifier means.

2. In a television receiver including a cathode ray tube adapted to produce at least one electron beam therein and further including a deflection yoke disposed adjacent the cathode ray tube having horizontal deflection windings for effecting the deflection of said electron beam in a horizontal sense and vertical deflection windings for effecting the deflection of said electron beam in a vertical sense, the combination comprising:

means for producing horizontal scansion signals;

horizontal transformer means comprising primary winding means adapted to receive the horizontal scansion signals, and secondary winding means for supplying deflection current to the horizontal deflection windings;

second secondary winding means formed on said horizontal transformer means having a first and a second end, said second secondary winding means being adapted to produce a positive voltage at the first end thereof upon the application of horizontal scansion signals to said primary winding means;

third secondary winding means formed on said horizontal transformer means having a first and a second end, said third secondary winding means being adapted to produce a negative voltage at the first end thereof upon the application of horizontal scansion signals to said primary winding means;

push-pull amplifier means connected directly to the vertical deflection windings for effecting a bidirectional current flow through said vertical deflection windings.

first rectifier means coupling said first end of said second secondary winding means and said push-pull amplifier means;

second rectifier means coupling said first end of said third secondary winding means and said push-pull amplifier means;

fourth secondary winding means formed on said horizontal transformer means having a first and a second end, said fourth secondary winding means being adapted to produce a positive voltage at the first end thereof;

third rectifier means coupled to said first end of said fourth secondary winding means;

sawtooth generator means for applying a periodic ramp-like voltage to said push-pull amplifier means;

means coupling said third rectifier means to said sawtooth generator means;

whereby variations in the horizontal scansion signals applied to said primary winding means effect corresponding changes in the voltage derived at the first end of said fourth secondary winding means.

3. The invention defined in claim 2, wherein said first, second and third rectifier means have reservoir capacitors associated therewith for mitigating excursions in the voltages produced thereby.

4. The invention defined in claim 3, further including voltage regulating means for receiving the voltage produced by said fourth secondary winding means and outputting a regulated voltage derived therefrom.

5. The invention defined in claim 4, wherein said means for producing horizontal scansion signals comprises a horizontal output stage and a horizontal oscillator coupled thereto, and wherein said voltage regulating means is adapted to produce a voltage for energizing said horizontal oscillator in the absence of a voltage across said fourth secondary winding means.

* * * * *